United States Patent [19]
Stevenson

[11] 3,878,805
[45] Apr. 22, 1975

[54] STABILIZED HORIZON PLANE SYSTEM
[75] Inventor: Duncan G. Stevenson, Kingston, Ontario, Canada
[73] Assignee: Her Majesty the Queen in right of Canada, as represented by the Minister of National Defence, Ottawa, Ontario, Canada
[22] Filed: Aug. 11, 1971
[21] Appl. No.: 170,905

[52] U.S. Cl. .............................................. 114/43.5
[51] Int. Cl. ............................................. B63b 35/44
[58] Field of Search .............................. 340/25–27; 114/43.5

[56] References Cited
UNITED STATES PATENTS
3,516,375  6/1970  Charlton ............................ 114/43.5
3,537,066  10/1970  Stingl ................................... 340/25
3,633,157  1/1972  Schuh .................................... 340/25

Primary Examiner—William C. Cooper
Attorney, Agent, or Firm—R. S. Sciascia; Arthur L. Branning; Philip Schneider

[57] ABSTRACT

A ship has a helicopter landing area and a horizontal plane indicating member with a substantially flat upper surface mounted for angular movement about axes parallel and transverse to the length of the ship. The indicator member is mounted in such a position on the ship and the flat upper surface is of such a size as to be clearly visible to the pilot of a helicopter when landing on the area. Means are provided for maintaining the indicating member in a horizontal attitude.

1 Claim, 4 Drawing Figures

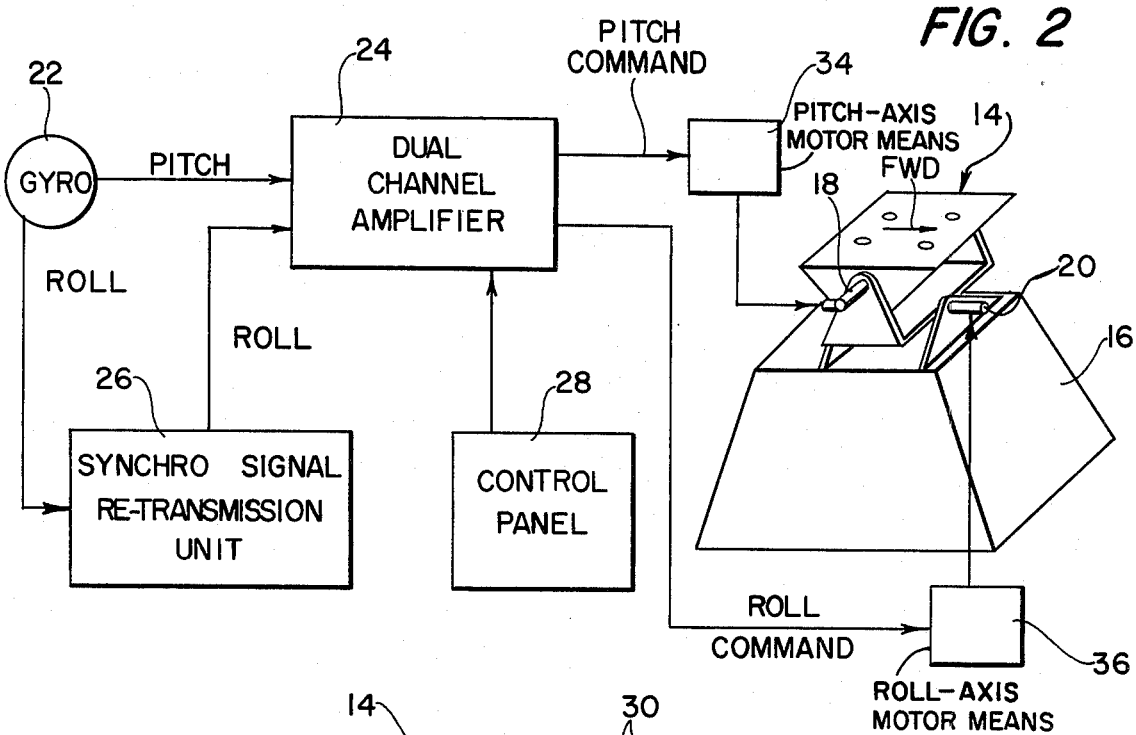
FIG. 2
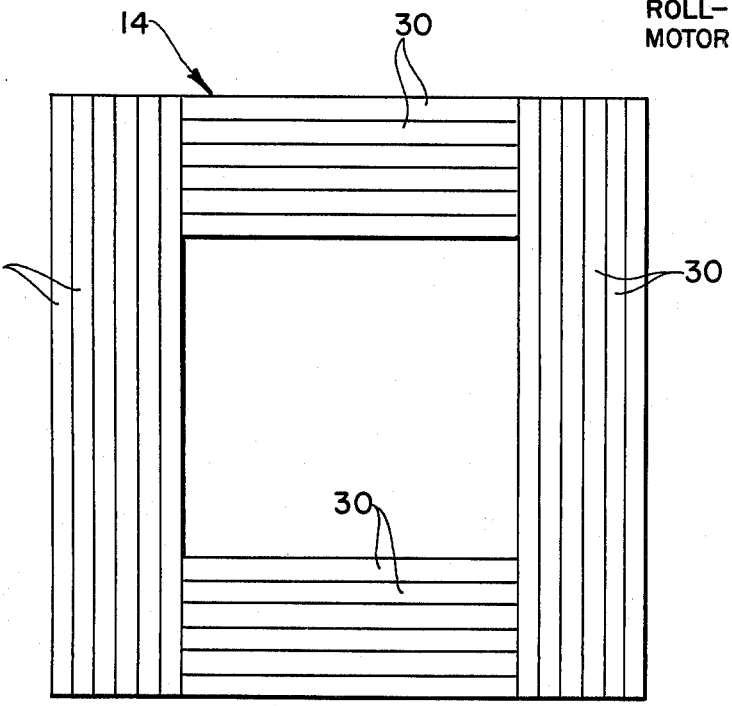
FIG. 3
FIG. 4
INVENTOR
DUNCAN G. STEVENSON
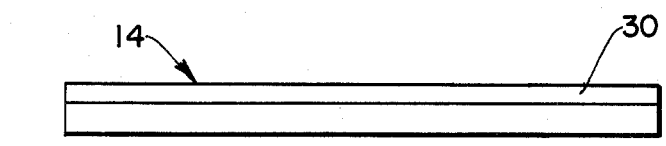
ATTORNEYS

STABILIZED HORIZON PLANE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to helicopter landing aids and especially to a horizontal-plane indicator for aiding helicopter landings on the deck of a ship.

It has been found that, during the final stages of landing a helicopter on a ship at night or in other bad visibility conditions, the pilot tends to overcorrect the attitude of the helicopter relative to the ship. It is believed that this is because the pilot tends to lose his appreciation of the horizontal plane as the ship changes its attitude relative thereto. The consequences of such overcorrection can be dangerous.

SUMMARY OF THE INVENTION

According to this invention, the ship is provided with a horizontal-plane-indicator member with a substantially flat upper surface mounted for angular movement about axes parallel and transverse to the length of the ship, the indicator member being mounted in such a position on the ship and its flat upper surface being of such size as to be clearly visible to the pilot of a helicopter during the landing operation. Means are provided to maintain the indicator member in a horizontal attitude. Thus the pilot receives an indication of the true horizontal plane during the landing operation.

An object of this invention is to provide the pilot of a helicopter landing on a ship a clear indication of the true horizontal plane.

Other objects, advantages and novel features of the invention will become apparent from the following detailed description of the invention when considered in conjunction with the accompanying drawings wherein:

BRIEF DESCRIPTION OF THE DRAWINGS

FIG. 2 is a schematic illustration, partly in block form, of an embodiment of the invention;

FIG. 3 is a plan view of the horizontal-plane-indicator member; and

FIG. 4 is a rear view of the horizontal-plane-indicator member.

DETAILED DESCRIPTION

Figure 1:
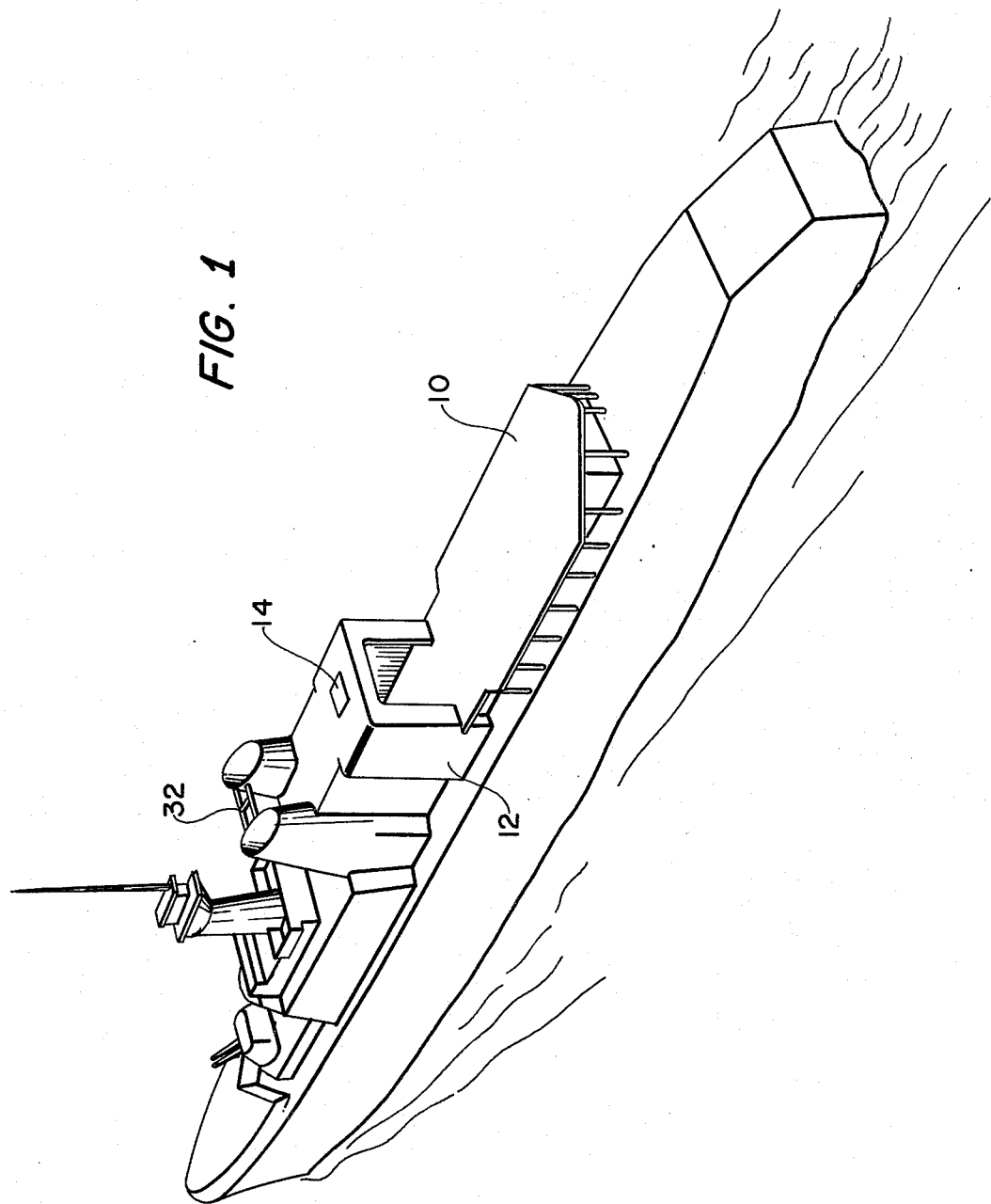
FIG. 1 is an isometric view of a ship with an indication of where the horizontal-plane-indicator member is mounted relative to the helicopter landing area.

FIG. 1 shows a ship having a helicopter landing area 10 in the rear part of the ship and a helicopter hangar 12 located forwardly of and adjacent to the landing area 10.

The ship is provided with a horizontal-plane-indicator 14 mounted on the hangar roof adjacent to the rear end thereof nearest the landing area 10 at a position midway between the sides of the ship. The horizontal-plane-indicator 14 has a flat upper surface which is square in plan view, convenient dimensions being of the order of 10 ft. × 10 ft. A pedestal 16 (See FIG. 2), secured to the roof of the hangar 12, carries the horizontal-plane indicator 14, the indicator 14 being mounted for angular movement relative to the pedestal by rotation about an axis 18 (pitch axis) transverse to the length of the ship and an axis 20 (roll axis) parallel to the length of the ship.

Angular movement of the horizontal-plane indicator 14 about the axes 18 and 20 is controlled by the ship's gyro or vertical reference system 22 to maintain the indicator 14 in a horizontal plane. A signal of the pitch of the ship passes from the gyro 22 to a dual-channel amplifier 24. The amplified signal is fed to pitch-axis motor means 34 which moves the indicator member 14 angularly about the pitch axis 18 to maintain the indicator member 14 at the desired attitude. Similarly, a signal of the roll of the ship passes through a synchro-signal retransmission unit 26 (if required) to the amplifier 24. The amplified signal is fed to a roll-axis motor means 36 which moves the indicator member 14 about the roll axis 20. The amplifier 24 is controlled from a control panel 28.

Strips 30 of electroluminescent tape are secured around the peripheral area of the upper surface of the indicator member 14 parallel to the edges thereof and a strip 30 of such tape is secured to the rear edge of the indicator member 14. The strips 30 are powered from a suitable electrical power supply which may be adjustable in magnitude and/or frequency to vary the brightness of the tapes.

Forwardly and higher than the horizontal-plane indicator 14 is an elongated bar 32 extending transversely of the ship and pivoted for angular movement about an axis parallel to the length of the ship (roll axis). The elongated bar 32 is located midway between the sides of the ship and is controlled by the ship's gyro or vertical reference system 22 to maintain the bar in a horizontal attitude, thereby indicating the horizon. This bar is described in Canadian application Ser. No. 006,773, filed Dec. 5, 1967.

To land a helicopter on the landing area 10, the pilot causes the helicopter to approach from the rear of the ship. During the approach, the pilot can see the horizontal-plane indicator 14 and the horizon-indicating bar 32. The horizontal-plane indicator 14 indicates the horizontal plane to the pilot and the elongated bar 32 indicates the horizon. Further, the horizontal-plane indicator 14 and the horizon-indicating bar 32 together give a depth perception to the pilot, and the location of the indicator member 14 on the hangar roof gives the pilot a good indication of his height when he is over the landing area and at a height approximating that of the hangar roof.

Obviously many modifications and variations of the present invention are possible in light of the above teachings. It is therefore to be understood that within the scope of the appended claims the invention may be practiced otherwise than as specifically described.

What is claimed and desired to be secured by, Letters Patent of the United States is:

1. The combination of:
    a ship having a helicopter landing area;
    a horizontal-plane indicator member with a substantially flat upper surface mounted for angular movement about axes parallel to and transverse to the length of the ship, the indicator member being mounted in such a position on the ship and the flat upper surface being of such a size as to be clearly visible to the pilot of a helicopter when landing on said area;
    means for maintaining the indicator member in a horizontal altitude; and
    electroluminescent tape secured to the upper surface of the indicator member only at the peripheral area thereof.

* * * * *